United States Patent
Moulaire et al.

(10) Patent No.: US 10,889,319 B2
(45) Date of Patent: Jan. 12, 2021

(54) USE OF A PHASE-LEAD FILTER TO SEPARATE THE MANUAL STEERING SETTING FROM THE POWER STEERING CONTROL STABILITY SETTING

(71) Applicant: JTEKT EUROPE, Irigny (FR)

(72) Inventors: Pascal Moulaire, La Tour de Salvagny (FR); Hervé Peltier, Saint Maurice sur Dargoire (FR); Arnaud Thiery, Brignais (FR); Tahar Slama, Ecully (FR)

(73) Assignee: JTEKT EUROPE, Irigny (FR)

( * ) Notice: Subject to any disclaimer, the term of this patent is extended or adjusted under 35 U.S.C. 154(b) by 509 days.

(21) Appl. No.: 15/574,537

(22) PCT Filed: Jun. 17, 2016

(86) PCT No.: PCT/FR2016/051478
§ 371 (c)(1),
(2) Date: Nov. 16, 2017

(87) PCT Pub. No.: WO2016/203171
PCT Pub. Date: Dec. 22, 2016

(65) Prior Publication Data
US 2018/0134309 A1 May 17, 2018

(30) Foreign Application Priority Data
Jun. 19, 2015 (FR) ..................... 15 55640

(51) Int. Cl.
*B62D 5/04* (2006.01)
*B62D 6/00* (2006.01)
*B62D 6/10* (2006.01)

(52) U.S. Cl.
CPC ........... *B62D 5/0463* (2013.01); *B62D 6/008* (2013.01); *B62D 6/10* (2013.01)

(58) Field of Classification Search
CPC ......... B62D 5/0463; B62D 6/10; B62D 6/008
See application file for complete search history.

(56) References Cited

U.S. PATENT DOCUMENTS

| 6,404,156 B1 * | 6/2002 | Okanoue | B62D 5/0463 318/432 |
| 2013/0311044 A1 | 11/2013 | Tamaizumi et al. | |
| 2015/0151783 A1 * | 6/2015 | Kitazume | B62D 5/0463 701/42 |

FOREIGN PATENT DOCUMENTS

| EP | 1 714 852 A2 | 10/2006 |
| EP | 2 177 421 A2 | 4/2010 |

(Continued)

OTHER PUBLICATIONS

Translation of JP2015003550A obtained via ESPACENET on May 5, 2020 (Year: 2015).*

(Continued)

*Primary Examiner* — Jeffrey C Boomer
(74) *Attorney, Agent, or Firm* — Oliff PLC

(57) ABSTRACT

A method for controlling a power steering device including a steering assist motor and a steering wheel. In the method, a steering wheel torque setpoint is generated, the actual steering wheel torque actually exerted by the driver on the steering wheel is measured, the difference, the so-called "steering wheel torque error", between the steering wheel torque setpoint and the actual steering wheel torque is determined, then a motor torque setpoint for the steering assist motor is generated from a first filtered proportional component on one hand, obtained by filtering via a phase-lead filter the steering wheel torque error weighted by a first assist gain, and from a second derivative return component on the other hand, obtained by calculating the time deriva- (Continued)

tive of the actual steering wheel torque and weighting the derivative by means of a second derivative gain.

7 Claims, 1 Drawing Sheet

(56) References Cited

FOREIGN PATENT DOCUMENTS

| EP | 2 323 250 A2 | | 5/2011 |
|---|---|---|---|
| JP | 2015003550 A | * | 1/2015 |

OTHER PUBLICATIONS

Sep. 29, 2016 International Search Report issued in International Patent Application No. PCT/FR2016/051478.

* cited by examiner

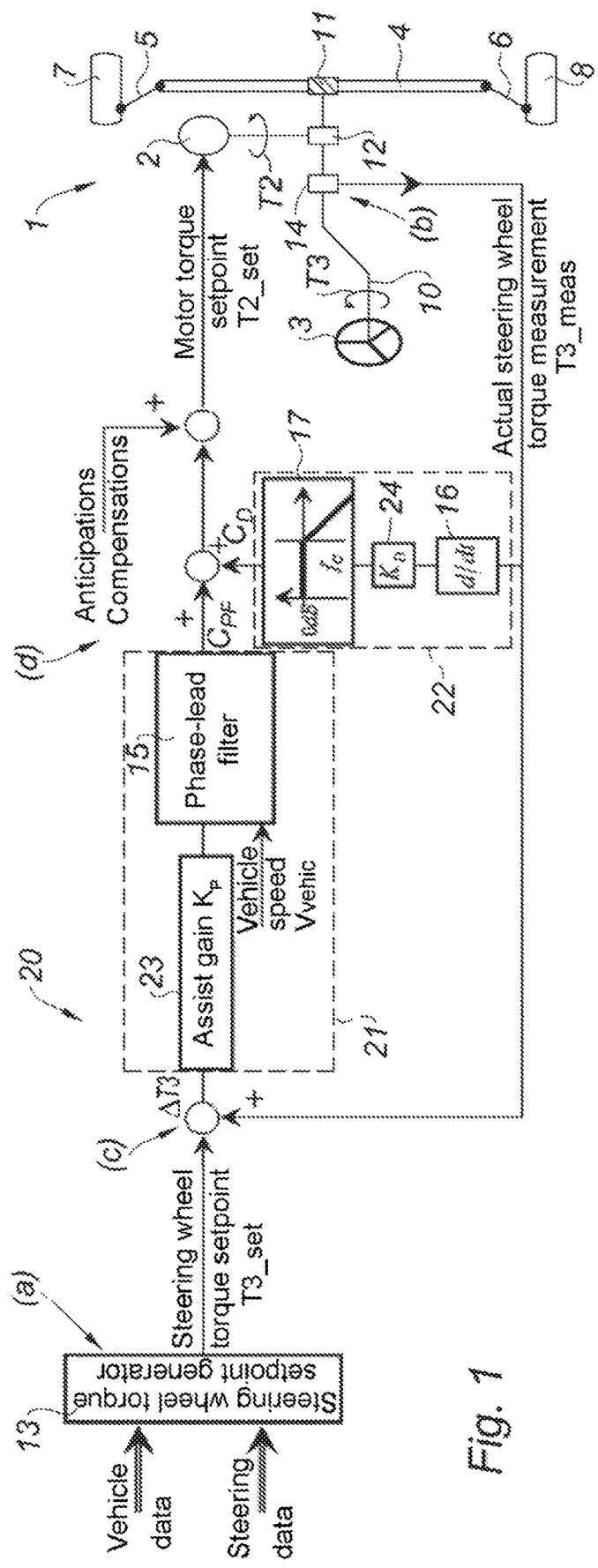
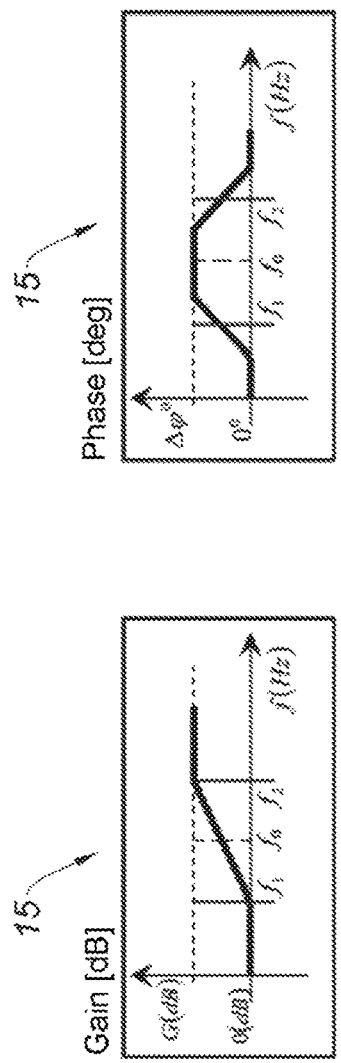
Fig. 1
Fig. 2A
Fig. 2B

USE OF A PHASE-LEAD FILTER TO SEPARATE THE MANUAL STEERING SETTING FROM THE POWER STEERING CONTROL STABILITY SETTING

The present invention concerns the servo-control methods allowing to manage a power steering device.

The present invention concerns more particularly a servo-control method which uses the steering wheel torque, that is to say the torque exerted by the driver on the steering wheel, as a servo-controlled variable.

Methods are already known comprising defining, according to the dynamic situation of the vehicle (speed, lateral acceleration, etc.) and to the configuration of the steering device (steering angle, rotational angular velocity of the steering wheel, etc.), a steering wheel torque setpoint, that is compared to the measurement of the actual steering wheel torque, actually exerted by the driver on the steering wheel at the considered moment, in order to determine afterwards a motor torque setpoint that is applied to an assist motor for said assist motor to act on the steering mechanism so that the actual steering wheel torque, felt by the driver, follows said steering wheel torque setpoint.

Generally, the engine torque setpoint is obtained in a proportional manner, by multiplying the difference between the steering wheel torque setpoint (which may, in some assist configurations, be zero) and the actual steering wheel torque, that is to say the steering wheel torque error, by a predetermined assist gain.

A first difficulty, during the implementation of such a servo-control, is related to the setting of the assist gain value.

Indeed, in order to provide good maneuver comfort, in particular when the vehicle is stopped (for example when the driver is executing a significant steering to leave a parking lot) or when the vehicle is running at low speed, so that the resistance that the steering mechanism, and more particularly the tires, oppose(s) to the steering maneuver, is relatively high, it is preferable to provide for a high assist gain, which allows the assist motor to provide a high torque without the driver having to exert significant torque on the steering wheel.

Yet, in order to guarantee the stability of the servo-control of the steering, and thus in particular avoid the occurrence of oscillations of the steering wheel, it is on the contrary necessary to limit the assist gain, that is to say to maintain said assist gain below a maximum admissible value which corresponds to a sufficient gain margin (within the meaning of the Nyquist criterion).

Furthermore, the mechanical part of the steering device is subjected to various physical phenomena, in particular to (dry and/or viscous) friction phenomena or inertial phenomena related to the mass of the different members constituting said mechanical part (shaft of the assist motor, rack, steering wheel, wheels, etc.).

Yet, these different phenomena can have side effects in terms of feeling behind the steering wheel, that is to say, on the way the driver perceives tactically, through the steering wheel, the behavior of the steering, and thus more generally on the way the driver feels and interprets intuitively the behavior of the vehicle.

In particular, frictions and inertia can for example give the feeling that the steering does not respond when a steering maneuver begins, that is to say when the driver starts to turn the steering wheel, thereby giving the driver an impression of gravity and lack of responsiveness.

Conversely, as soon as the driver reaches, behind the steering wheel, a sufficient force for the dry static friction to be overcome, the steering can suddenly relax. This abrupt detachment effect (also known as a "stick slip") gives an unpleasant feeling of jerky driving.

Such an abrupt detachment effect is particularly sensitive during the "zero outputs", that is to say when the driver starts to turn the steering wheel (to the left or, respectively, to the right) from an angular position of a substantially centered origin, so as to switch the steering device from a zero steering angle which typically corresponds to a straight-line trajectory, to a non-zero steering angle which corresponds to a curved trajectory, or during the steering reversals, that is to say when the driver reverses the direction of rotation of the steering wheel (to switch from right steering to a left steering, or vice versa).

In order to limit such effects, it may be possible to use, during the determination of the motor torque setpoint, a steering wheel torque derivative feedback, that is to say a feedback branch ("feedback") which measures the actual steering wheel torque, that is to say the value of the steering wheel torque which is actually exerted by the driver on the steering wheel, and which calculates the time derivative of this actual steering wheel torque, so as to allow taking into account this derivative, weighted by a derivative gain, during the production of the motor torque setpoint.

However, the introduction of a derivative feedback in the servo-control loop of the steering device can also be a source of instability.

In particular, with the assist gain and the derivative gain both affecting the overall conditions of the servo-control stability, these two parameters are in practice interdependent, so that the setting of the derivative gain can be carried out only within a range conditioned and limited by the value of the assist gain, and vice versa.

In such a configuration, and with regard to the need to preserve at any moment a gain margin which is sufficient to guarantee the stability of the servo-control, it is thus for example not possible to maximize the derivative gain and to take full advantage of the improvement in the feeling provided by the action of the derivative feedback nor, conversely, to maximize the assist gain to optimize the action of the assist motor and thus the efficiency and comfort of the assistance during maneuvers of the steering.

The objects assigned to the invention aim therefore to improve the known power steering servo-control methods so as to be able to reconcile an effective and powerful assistance, a faithful and comfortable feeling of the behavior of the steering, as well as an excellent stability of the servo-control.

The objects assigned to the invention are achieved by means of a servo-control method of a power steering device comprising an assist motor and a steering wheel on which a driver can exert a force called "steering wheel torque", said method comprising a step (a) of defining a steering wheel torque setpoint, comprising generating a steering wheel torque setpoint representative of a steering wheel torque value to be reached, a step (b) of measuring an actual steering wheel torque, comprising measuring the value, called "actual steering wheel torque", of the steering wheel torque which is really exerted by the driver on the steering wheel, a comparison step (c) comparing determining the difference, called "steering wheel torque error", between the steering wheel torque setpoint and the actual steering wheel torque, a step (d) of determining the motor torque setpoint comprising generating a motor torque setpoint which is intended to be applied to the assist motor in such a way that the assist motor can act to reduce the steering wheel torque error, said method being characterized in that, during the step (d) of determining the motor torque setpoint, the motor torque setpoint is generated, on the one hand, from a first component, called "filtered proportional component", obtained by filtering by a phase-lead filter the steering wheel torque error weighted by a first gain called "assist gain" and, on the other hand, from a second component, called "derivative feedback component", obtained by calculating the time derivative of the actual steering wheel torque and by weighting said time derivative of the actual steering wheel torque by a second gain called "derivative gain".

Advantageously, the combined use of a proportional component filtered by a phase-lead filter and of a derivative feedback component makes it possible to make the overall stability of the servo-control based on the phase-lead filter, so that it becomes possible to set very freely, in an almost independent manner, and in particular to increase up to high values, each of the assist and derivative gains, so as to be able to benefit fully and simultaneously, on the one hand, from the function of amplification of the motor setpoint, and therefore of amplification of the steering maneuver force, provided by the assist gain and, on the other hand, from the function of improvement (smoothing) of the feeling of the steering behavior, provided by the derivative gain.

Indeed, since the stability of the servo-control is guaranteed by the presence of the phase-lead filter, which completes the proportional action of the assist gain, then the stability of the servo-control, for a given assist gain, is almost no longer dependent on the choice of the value of the derivative gain, so that the setting of the derivative gain, and therefore the quality of the improvement of the feeling, is decorrelated from the setting of the stability.

The invention thus makes it possible to separate the setting function of the stability, which is ensured by the phase-lead filtering, from the setting function of the feeling, which is based on the choice of the derivative gain.

As a result, with the derivative gain setting no longer interfering with the setting of the servo-control stability, and in particular with the setting of the low-frequency stability (typically below 25 Hz), it is possible, in all circumstances, to set and to make the derivative gain change freely over time, in order to optimize the feeling of the steering behavior, while remaining free of the choice and of the change over time of the assist gain, which makes it possible to adapt and optimize also at any time the level of assistance provided by the assist motor.

The respective settings of the stability, by the phase-lead filter, of the level (intensity) of assistance, through the assist gain, and of the feeling of the steering behavior, through the derivative gain, are thus simplified and optimized thanks to the decoupling of these settings obtained by the presence of the phase-lead filter.

Other objects, features and advantages of the invention will become apparent in more detail upon reading the following description, as well as from the accompanying drawings, which are provided for illustrative and non-restrictive purposes, among which:

FIG. 1 illustrates, according to a schematic view, the implementation of a servo-control method according to the invention within a power-steering device.

FIGS. 2A and 2B illustrate the Bode diagrams, respectively the gain diagram and the phase diagram, of phase-lead filters which can be used by the method according to the invention.

The invention concerns a servo-control method of a power steering device 1.

As illustrated in FIG. 1, the power steering device 1 comprises an assist motor 2 as well as a steering wheel 3 on which a driver can exert a force, and more particularly a torque, called "steering wheel torque" T3.

The power steering device 1 comprises also preferably, in a manner known per se, a rack 4 which is slidably mounted in a steering casing fixed on the frame of the vehicle.

The rack is linked, respectively by a left tie rod 5 and a right tie rod 6, to a left steered wheel 7 and a right steered wheel 8, so that the displacement in translation of the rack 4 causes the modification of the steering angle (yaw orientation) of said steered wheels 7, 8.

The steering wheel 3 is preferably fixed on one end of a steering column 10, the other end of which is provided with a drive pinion 11 which meshes on the rack 4.

The assist motor 2 is preferably an electric motor, with a bidirectional operation, for example a "brushless" motor.

The assist motor 2 is arranged so as to be able to exert an assist force, and more particularly an assist torque T2, on the rack 4, by means of any suitable transmission mechanism.

To this end, the assist motor 2 can, for example, engage the steering column 10, via a reducer 12, such as a worm wheel reducer and a worm screw reducer, to form a mechanism called "single pinion" mechanism, as illustrated in FIG. 1.

According to a variant (not shown), the motor can directly engage the rack 4, for example by means of a ball screw or by means of a secondary pinion, distinct from the drive pinion 11 fixed on the steering column 10, within a mechanism called "double-pinion" mechanism.

Of course, the method according to the invention is applicable to any type of power steering 1, in particular whatever the driving configuration of the rack 4 by the assist motor 2, and more generally whatever the configuration of the mechanism enabling the assist motor 2 to modify the orientation of the steered wheels 7, 8.

According to the invention, said method comprises a step (a) of defining a steering wheel torque setpoint, comprising generating a steering wheel torque setpoint T3_set which is representative of a steering wheel torque value to be reached.

The servo-controlled variable by the method is indeed the steering wheel torque T3.

According to a particularly simplified first possibility of implementation, called "passive conventional servo-control", the step (a) of defining a steering wheel torque setpoint will be implemented, uniquely and in advance, during a factory setting, or during the computer coding of the program corresponding to the servo-control method. The steering wheel torque setpoint T3_set will be then fixed, and randomly chosen equal to zero.

However, according to a particularly preferred second possibility of implementation, called "active servo-control", the step (a) of defining a steering wheel torque setpoint will be periodically repeated in an automatic manner, to allow the refreshment and the change of the steering wheel torque setpoint T3_set over time, depending on the life situations of the vehicle.

According to this second possibility of implementation, and as shown in FIG. 1, the steering wheel torque setpoint will be generated, in real time, by a steering wheel torque setpoint generator module 13, according to predefined assist laws which may be typically in the form of mappings, or "maps" and which associate, with each life situation of the vehicle, a steering wheel torque setpoint T3_set which corresponds to the steering wheel torque T3 which should be felt behind the steering wheel at the considered moment given said life situation of the vehicle.

For this purpose, the torque setpoint generator module 13 uses as input, on the one hand, "vehicle data" representative of the dynamic situation of the vehicle at the considered moment, such as the longitudinal speed of said vehicle, the lateral acceleration of said vehicle, etc., and, on the other hand, "direction data", representative of the configuration of the steering device 1 at the considered moment, such as the steering angle, the rotational speed of the steering wheel 3, etc., data from which said generator module 13 determines the steering wheel torque setpoint T3_set.

The method also comprises a step (b) of measuring the actual steering wheel torque, comprising measuring the value, called "actual steering wheel torque" T3_meas, of the steering wheel torque that is really exerted by the driver on the steering wheel 3.

To this end, any suitable torque sensor 14 can be used, and for example, a magnetic torque sensor, measuring the torsional elastic deformations of a torsion bar interposed between an upstream part of the steering column 10, which carries the steering wheel 3, and a downstream part of the steering column 10, which carries the drive pinion 11.

The method then also comprises a comparison step (c) comprising determining the difference, called "steering wheel torque error" $\Delta T3$, between the steering wheel torque setpoint T3_set and the actual steering wheel torque T3_meas: $\Delta T3 = T3\_set - T3\_meas$ (or vice versa, depending on the retained sign convention).

It should be noted that, by simple convention of representation, in FIG. 1, the actual steering wheel torque T3_meas is assigned with a positive sign, while the steering wheel torque setpoint T3_set is (implicitly) assigned with the opposite sign, that is to say a negative sign (so that $\Delta T3 = T3\_meas - T3\_set$ is formally presented). Of course, the situation could be reversed, without departing from the scope of the invention.

The method then comprises a step (d) of determining the motor torque setpoint comprising generating a motor torque setpoint T2_set which is intended to be applied to the assist motor 2 so as the assist motor 2 can act to reduce the error of the steering wheel torque $\Delta T3$.

In other words, in application of the motor torque setpoint T2_set, the assist motor 2 will deliver an assist torque T2 which will make it possible to converge the actual steering wheel torque T3_meas to the target value which constitutes the steering wheel torque setpoint T3_set, which will have the effect of reducing the torque error $\Delta T3$ (that is to say of bringing it close to zero).

According to the invention, during step (d) of determining the motor torque setpoint, the motor torque setpoint T2_set is generated from:
- on the one hand, a first component, called "filtered proportional component" $C_{PF}$, obtained by filtering, by a phase-lead filter 15, the steering wheel torque error $\Delta T3$ weighted by a first gain called "assist gain" $K_P$,
- and, on the other hand, a second component, called "derivative feedback component" $C_D$, obtained by calculating the (first) time derivative of the actual steering wheel torque: $d(T3\_meas)/dt$, and by weighting said time derivative of the actual steering wheel torque by a second gain called "derivative gain" $K_D$.

The assist gain $K_P$, which here corresponds to a (proportional) amplification coefficient of the torque error $\Delta T3$, can be advantageously provided by a suitable mapping and may, if necessary, change in real time, so as to adapt the amount of assistance to each life situation of the vehicle, and in particular the degree of amplification of the torque error $\Delta T3$ and therefore the final intensity of the assist torque T2 delivered by the assist motor 2.

The setting (the choice) of the assist gain $K_P$ will thus make it possible to define the desired level of assistance, that is to say quantify the level of intervention of the assist motor 2 (relative to the manual force T3 exerted by the driver) in the overall (manual and motorized) maneuver action of the steering 1.

Similarly, the derivative gain $K_D$ will allow, by a proportional action on the value of the time derivative of the actual steering wheel torque $d(T3\_meas)/dt$, to define the feeling of the behavior of the steering, and more particularly to choose the degree of smoothing of the feeling of the steering behavior.

Said derivative gain $K_D$ may also be defined by an appropriate mapping, and may be likely to change over time, depending on the life situation of the vehicle.

Although it is not excluded to use, according to the configuration and the retained programming convention to implement the method, a unity assist gain $K_P$ or a unity derivative gain $K_P$, said gains $K_P$, $K_D$ will be preferably non-unitary, and can be advantageously set as required, and in particular depending on the life situation of the vehicle.

Furthermore, it will be noted that the servo-control proposed by the invention, and in particular the combined use of a derivative feedback component $C_D$ and of a phase-lead filter 15 applied to the steering wheel torque error $\Delta T3$, as described above, is applicable to a conventional passive servo-control, in which the steering wheel torque setpoint T3_set is fixed and equal to zero (and therefore the steering wheel torque error $\Delta T3$ simply equal to the measured value of the actual steering wheel torque T3_meas), as well as to an active servo-control, in which a changing steering wheel torque setpoint T3_set (and mostly non-zero) is determined in real time.

In the case of the passive conventional servo-control, in the absence of (non-zero) steering wheel torque setpoint T3_set, the invention will simply amount to using in combination, on the one hand, a derivative feedback component $C_D$ as described above, calculated from the derivative of the actual steering wheel torque T3_meas and, on the other hand, a phase-lead filter 15 applied to a value simply and directly proportional (via the assist gain $K_P$) to the measured value of the actual steering wheel torque T3_meas.

In other words, the particularly simplified conventional passive servo-control will calculate the filtered proportional component $C_{PF}$ only from the feedback constituted by the measurement of the actual steering wheel torque T3_meas.

In any event, and in particular whether it is a fixed and zero steering wheel torque setpoint T3_set or, on the contrary, a variable and (potentially) non-zero steering wheel torque setpoint T3_set, the combined use of a phase-lead filter 15 associated with the steering wheel torque error $\Delta T3$ and with a bypass module 16 ensuring a derivative feedback of the actual steering wheel torque T3_meas allows, as mentioned above, to cumulate, on the one hand, the beneficial effects of a freely chosen assist amplification (by the filtered proportional component $C_{PF}$), and in particular of a significant amplification of the assistance with, on the other hand, a level of feeling of the steering 1 behavior which will be freely chosen (by the derived component $C_D$), and in particular which will be effectively smoothed to limit or even "erase" therefrom the saccades and other impressions of gravity or delays, while guaranteeing the stability, and in particular the low-frequency stability, of the servo-control (thanks to the phase-lead filter 15).

As such, it will be noted that the mechanical part of the steering device 1, which comprises in particular the various members of the steering wheel 3, the steering column 10, the torsion bar of the torque sensor 14 inserted on said steering column 10, the drive pinion 11, the rack 4, the tie rods 5, 6 and the steered wheels 7, 8, can be generally assimilated to a mass-spring system, or even a mass-spring-damper.

In particular, the spring effect may come from the intrinsic elasticity of the mechanical members, and in particular of the easily deformable mechanical members such as the torsion bar of the torque sensor 14 or the tires which are fitted to the wheels 7, 8.

Yet, such a mass-spring system (or mass-spring-damper) has (at least) one fundamental frequency (resonance frequency) $f_0$, in practice typically comprised between 12 Hz and 20 Hz.

In this low-frequency range (herein lower than 25 Hz or even than 22 Hz, and more particularly lower than or equal to 20 Hz), it is therefore necessary to define the (overall) gain of the servo-control so that there is no risk of switching to an unstable (oscillating) mode when the steering mechanism 1 is energized.

To this end, it is therefore necessary to preserve, in particular whatever the assist gain $K_P$, a sufficient gain margin (gain value to be added for bringing the system to the limit of the stability), that is to say graphically a sufficient distance between the Nyquist plot (representation, in the complex plane, of the transfer function of the open-loop servo-control) and the coordinate point $(-1, 0)$.

This is the role fulfilled by the phase-lead filter 15.

The phase-lead filter 15 may be of any suitable type, provided that said filter 15 can provide the signal it processes (herein the steering wheel torque error weighted by the assist gain) with a phase-lead, that is to say apply a positive phase shift $\Delta\varphi$ thereto.

Preferably, the phase-lead filter 15 is a first order filter.

Such a choice makes it possible to carry out a filtering that is simple, fast, that requires little calculation resources, and which nevertheless allows to effectively ensure a sufficient stability, in particular by compensating for the destabilizing effects of an increase in the assist gain $K_P$.

Of course, the phase-lead filter 15 can be selected from any order n equal to or greater than 1, and for example form a filter of the second or third order.

Whatever the retained order n, the (maximum) phase shift $\varphi\Delta$ obtained accordingly by an n-order phase-lead filter, that is to say in this case the (maximum) phase-lead $\Delta\varphi$ introduced accordingly, will be +n*90 degrees, as illustrated in particular in FIG. 2B.

Similarly, the maximum amplification gain G (dB) of said phase-lead filter 15 will be +n*20 dB.

Preferably, the phase-lead filter 15 is in the form of:

$$H(s) = \frac{1 + T_1 \cdot s}{1 + T_2 \cdot s}$$

with:
$T_1 = 1/(2 \cdot \pi \cdot f_1)$, where $f_1$ represents a first cutoff frequency,
$T_2 = 1/(2 \cdot \pi \cdot f_2)$, where $f_2$ represents a second cutoff frequency (higher than the first cutoff frequency $f_1$),
s is the Laplace operator.

Such a filter 15 corresponds to the diagrams illustrated in FIGS. 2A and 2B.

It advantageously offers, between the cutoff frequencies $f_1$, $f_2$, a phase-lead plate $\Delta\varphi=+n*90$ degrees, as well as a gain ramp (which starts at the first cutoff frequency $f_1$ and then peaks asymptotically from, and beyond, the second cutoff frequency $f_2$).

Such a filter 15 advantageously makes it possible to define, in a simple manner that requires little calculation resources, the interval $[f_1; f_2]$ wherein said filter 15 leads the phase actively, and therefore acts actively to stabilize the servo-control.

In practice, the cutoff frequencies $f_1$, $f_2$ will be preferably chosen so as to frame the fundamental frequency $f_0$ of the steering mechanism.

By way of indication, the first (minimum) cutoff frequency $f_1$ may be substantially equal to 6 Hz, whereas the second (maximum) cutoff frequency $f_2$ may be substantially equal to 22 Hz.

Preferably, the phase-lead filter 15 having at least a first cutoff frequency $f_1$, and preferably a first and a second cutoff frequency $f_1$, $f_2$, the cutoff frequency, and preferably the cutoff frequencies $f_1$, $f_2$, is/are set depending on the longitudinal speed $V_{vehic}$ of the vehicle which is fitted with the power steering device 1, as illustrated in FIG. 1.

The fact that the stability margin (typically the gain margin) may be different when the vehicle is stopped (zero speed $V_{vehic}$) and running (non-zero speed $V_{vehic}$), may thus be advantageously taken into account.

Indeed, for example, the elasticity of the tire may intervene in a more significant manner when the vehicle is running than when it is stopped, and thus modify the fundamental frequency $f_0$ of the steering mechanism.

Similarly, the need for maneuver assistance of the steering 1 is more significant in the case of a parking (substantially zero speed), or of a low-speed circulation (typically between 0 and 50 km/h) than in a case where is at a higher speed. Thus, there will be a tendency to increase the low-speed assist gain $K_P$, especially as the speed $V_{vehic}$ is approaching zero, which will have a negative impact on the stability, and will require in this respect a wider compensation by the phase-lead filter 15.

More particularly, with the first cutoff frequency $f_1$ being strictly lower than the second cutoff frequency $f_2$, it will be possible to increase the first cutoff frequency $f_1$ and/or decrease the second cutoff frequency $f_2$ when the longitudinal speed of the vehicle $V_{vehic}$ increases, so as to reduce the interval $[f_1; f_2]$ between the first cutoff frequency $f_1$ and the second cutoff frequency $f_2$.

Thus, it will be possible to reduce the frequency interval $[f_1; f_2]$ corresponding (substantially) to the width of the phase-lead tray $\Delta\varphi$ when the speed vehicle $V_{vehic}$ increases, in particular when the vehicle passes from a stop situation (zero speed) to a running situation (non-zero speed), and/or when the speed of the vehicle $V_{vehic}$ increases in a low-speed range, typically between 0 km/h and 50 km/h.

Conversely, the interval $[f_1; f_2]$ can be extended when the speed of the vehicle decreases, in particular when said speed drops below 50 km/h, and especially when said speed cancels out.

Preferably, during modifications in the width of the interval $[f_1; f_2]$, the latter remains substantially centered on the same constant center frequency, which is $\frac{1}{2}(f_1+f_2)$, said center frequency may, if necessary, correspond to the fundamental frequency $f_0$ of the steering mechanism when the vehicle is stopped.

Moreover, preferably, when calculating the derivative feedback component $C_D$, a low-pass filter 17 is applied in order to reduce the (high frequency) digital noise.

Said low-pass filter 17 will be preferably applied after the weighting by the derivative coefficient $K_D$, which weighting follows itself the bypass module 16, as illustrated in FIG. 1.

The low-pass filter 17 will preferably have a cutoff frequency fc comprised between 150 Hz and 200 Hz, particularly if the sampling frequency at which is carried out the refreshment of the servo-control, and in particular the refreshment of the measurement of the actual steering wheel torque T3_meas and the calculation of the derivative of said actual steering wheel torque, is substantially equal to 1 kHz, which corresponds to a sampling period of one millisecond.

Thanks to said low-pass filter 17, the digital noise of a frequency greater than said cutoff frequency fc can be eliminated.

It should be noted that, during the step (d) of determining the motor torque setpoint, the algebraic sum of the filtered proportional component $C_{PF}$ and of the derivative feedback component $C_D$ is preferably made.

Although other forms of combination of these components $C_{PF}$, $C_D$ can be considered, the algebraic sum offering in particular a high degree of simplicity.

The filtered proportional component $C_{PF}$ and the derivative feedback component $C_D$, as well as their algebraic sum, are therefore homogeneous at a motor torque setpoint T2_set.

If necessary, said algebraic sum of the filtered proportional components $C_{PF}$ and of the derivative feedback $C_D$ can be used as such as motor torque setpoint T2_set.

However, according to a possible variant of implementation, it is also possible to plan on adding, to said algebraic sum of the filtered proportional $C_{PF}$ and derivative feedback $C_D$ components, other corrective components, such as an anticipation and/or a compensation component, in order to form, in fine, the motor torque setpoint T2_set which is then applied to the assist motor 2.

An "anticipation component", also called "prepositioning component", is a corrective component, of the offset type, which is introduced from the outset in the motor torque setpoint T2_set, typically to increase the magnitude of said motor torque setpoint T2_set, when it is known in advance, even before applying the motor torque setpoint T2_set to the assist motor 2, that the steering system will not behave exactly as it is desired to behave.

By way of example, if the occurrence of a non-zero static error, whose value is known, is systematically observed, the anticipation component will allow to increase the algebraic sum of the filtered proportional component $C_{PF}$ and of the derivative feedback component $C_D$ from a corresponding (offset) value to said static error.

A "compensation component" may, in turn, be for example intended to compensate for the effects of dry frictions or the effects of inertia of the steering mechanism.

In the case of dry frictions, it is possible to calculate an estimated value of said frictions, by any suitable means, and then apply a friction compensation component whose value will correspond to said estimated value of the frictions.

In the case of inertia, which tends to lead to a delay in the reaction of the system, it is possible, for example, to calculate an inertial compensation component whose value will be equal to the product of a gain (called "second derivative gain"), representative of the inertia, by the second time derivative of the angular position of the steering wheel (that is to say the angular acceleration of the steering wheel).

Of course, the invention also concerns as such a servo-control module 20 for a power steering device 1 comprising a generator module 13 of the steering wheel torque setpoint T3_set, a measuring module (sensor) 14 of the actual steering wheel torque T3_meas, an amplification module 21 allowing to generate the filtered proportional component $C_{PF}$ from the steering wheel error ΔT3, and a derivative feedback module 22 allowing to generate the derivative feedback component $C_D$ from the measured actual steering wheel torque T3_meas.

The amplification module 21 forms advantageously a first branch, called "proportional branch", which includes a first weighting module 23 within which the steering wheel torque error ΔT3 is multiplied by an assist gain $K_P$, so as to obtain a gross proportional component, as well as a phase-lead filter 15 applied to said gross proportional component so as to obtain a filtered proportional component $C_{PF}$.

The derivative feedback module 22 forms, in turn, a second branch called "derivative feedback branch", distinct from the first proportional branch, and which comprises successively a bypass module 16 which calculates the first time derivative of the actual steering wheel torque d(T3_meas)/dt, a second weighting module 24, which multiplies the first time derivative of the actual steering wheel torque by the derivative gain $K_0$, and a low-pass filter 17 which eliminates the digital noise.

The two branches 21, 22 then meet (via their respective downstream portions, that is to say, in particular downstream of the phase-lead filter 15 for the first proportional branch 21, and downstream of the bypass module 16, and more particularly downstream of the low-pass filter 17, for the second derivative feedback branch 22) into an algebraic sum, which combines the filtered proportional $C_{PF}$ and derivative feedback $C_D$ components, and serves as a basis for the motor torque setpoint T2_set.

Any module 16, 20, 21, 22, 23, 24 and any filter 15, 17 mentioned above, and in particular the servo-control module 20 as a whole, the phase-lead filter 15, the bypass module 16 and more generally the derivative feedback module 22, can be made by any calculator, computer, electronic board or suitable programmable logic controller, the structure of the modules and filters can be physical, and defined by the wiring of the electronic and/or virtual components, and obtained by computer programming.

The invention is in no way limited to the variants of the aforementioned embodiments, the person skilled in the art being in particular capable of isolating or combining together freely one or both of the characteristics described in the foregoing or substituting them with equivalents.

In particular, it is not excluded to modify the application order of the assist gain $K_P$ and of the phase-lead filter 15 within the proportional branch 21, or the application order of the bypass module 16, of the derivative gain $K_D$ and of the low-pass filter 17 within the derivative feedback branch 22.

The invention claimed is:

1. A servo-control method of a power steering device comprising an assist motor and a steering wheel on which a driver can exert a force, called "steering wheel torque", the method comprising:
   defining a steering wheel torque setpoint, comprising generating a steering wheel torque setpoint representative of a steering wheel torque value to be reached,
   measuring an actual steering wheel torque, comprising measuring the value, called "actual steering wheel torque", of the steering wheel torque which is really exerted by the driver on the steering wheel,
   determining the difference, called "steering wheel torque error", between the steering wheel torque setpoint and the actual steering wheel torque,
   determining the motor torque setpoint, comprising generating a motor torque setpoint applied to the assist motor so that the assist motor can act to reduce the steering wheel torque error, the motor torque setpoint being generated from a first component, called "filtered proportional component", obtained by filtering, by a phase-lead filter, the steering wheel torque error weighted by a first gain called "assist gain" and a second component, called "derivative feedback component", obtained by calculating the time derivative of the actual steering wheel torque and weighting the time derivative of the actual steering wheel torque by a second gain called "derivative gain".

2. The method according to claim 1, wherein the phase-lead filter is a first order filter.

3. The method according to claim 1, wherein the phase-lead filter is in the form of:

$$H(s) = \frac{1 + T_1 \times s}{1 + T_2 \times s}$$

with:

$T_1 = 1/(2 \times \pi \times f_1)$, where $f_1$ represents a first cutoff frequency $T_2 = 1/(2 \times \pi \times f_2)$, where $f_2$ represents a second cutoff frequency, and s is the Laplace operator.

4. The method according to claim 3, wherein, with the first cutoff frequency being lower than the second cutoff frequency, the first cutoff frequency is increased and/or the second cutoff frequency is decreased when the longitudinal speed of the vehicle increases, reducing the interval comprised between the first cutoff frequency and the second cutoff frequency.

5. The method according to claim 1, wherein, with the phase-lead filter having at least a first cutoff frequency, the cutoff frequency is set according to the longitudinal speed of the vehicle equipped with the power steering device.

6. The method according to claim 1, wherein, during the calculation of the derivative feedback component, a low-pass filter is applied in order to reduce the digital noise.

7. The method according to claim 1, wherein the determining of the motor torque setpoint further comprises making the algebraic sum of the filtered proportional component and of the derivative feedback component.

* * * * *